March 19, 1929. L. J. LEON 1,706,239
STAND
Filed June 23, 1924
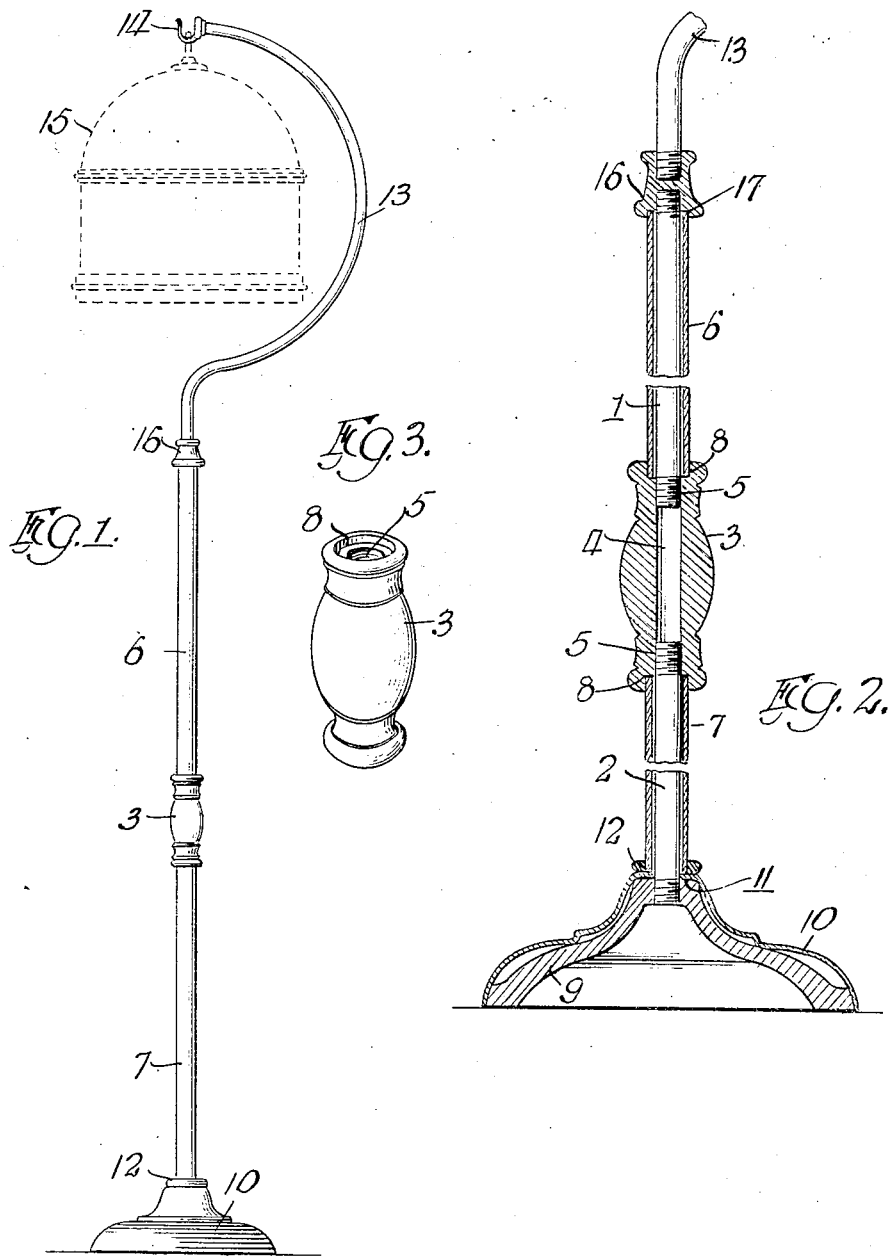

Patented Mar. 19, 1929.

1,706,239

UNITED STATES PATENT OFFICE.

LEWICKI J. LEON, OF CHICAGO, ILLINOIS, ASSIGNOR TO STATE BANK OF CHICAGO, TRUSTEE, OF CHICAGO, ILLINOIS, A CORPORATION OF ILLINOIS.

STAND.

Application filed June 23, 1924. Serial No. 721,679.

This invention relates to stands for bird cages and also to a combined ornament and joiner for use in connection therewith.

In the accompanying drawings—

Fig. 1 is a view of a bird-cage stand embodying the features of my invention;

Fig. 2 is a vertical sectional view through the stand; and

Fig. 3 is a perspective view of the ornament and joiner.

The upright portion of the stand consists of two pipe sections 1, 2 arranged end to end and coupled together at their opposed ends by a combined ornament and joiner 3 of my invention. The joiner 3 is between the opposed ends of the pipe sections 1, 2, and with the pipe sections of substantially the same length the joiner 3 is mid-way the length of the upright portion of the stand. The joiner 3 may be given such shape as may be desired for ornamental purposes in addition to such finish as may be needed to conform to the design of the stand.

The joiner 3 has a bore 4 extending lengthwise through it and into which the opposed ends of the pipe sections 1, 2 extend. Screw-threads 5, 5 are at the ends of this bore to receive the threaded ends of the pipe sections 1, 2.

Tubular casings 6, 7 surround the pipe sections 1, 2 and conceal the same, there being one tube about each pipe section. The tubes 6, 7 may be made of brass or other metal with any outside finish desired, dull, bright, or painted, depending on the style of the stand. With the pipe sections 1, 2 concealed, they may be of iron and the outside tubes of relatively thin brass or other tubing, making the cost of the stand less than a solid brass one.

Annular channels 8, 8 are provided at the ends of the joiner 3 to receive the opposed ends of the tubes 6, 7, as shown in Fig. 2. These channels form retainers or seats for the tube ends and hold them in place.

At the lower end of the stand is a flared iron base 9 covered by an outside shell 10, of sheet metal brass if required and ornamented in shape or otherwise with a finish to conform to that of the rest of the stand. The shell 10 has its upper end turned in to provide a flange 11, on which seats the lower end of the lower tube 7, as shown in Fig. 2. A ring or collar 12 fitted about the lower end of said tube 7 holds it in place at the base 9 and provides a neat joint at this part of the stand.

At the upper end of the stand is a curved section or arm 13 having a hook 14 at its upper end, from which may be hung a bird cage 15. The lower end of this curved section 13 is connected to the upper end of the upper pipe by a fitting 16, screw-threaded for the adjacent ends of the sections 1 and 13 and recessed on its under side as at 17 for the upper tube 6, as shown.

The entire stand being made in sections may be shipped knock-down in cartons or other containers relatively small in size and easily handled. The joiner 3, in addition to being an ornament, joins its sections together when the stand is set up, and also by its recesses 8, 8 conceals the tube ends, making a finished appearance where they meet the joiner. The latter may be machined and thus be turned to have the contour desired.

The pipe sections 1, 2 are preferably the same in diameter and so are the tubes 6, 7, thereby cheapening the cost of making the upright portion of the stand by having the sections the same. The joiner 3 spaces apart the opposed ends of the tubes and pipes, thus making the joiner take up a portion of the length of the stand and thereby reduce to the minimum the length of the associated sections. The diameter of the bore of the joiner 3 is also approximately that of the pipes, so as to better space their opposed ends apart for the purpose stated.

I claim as my invention:

1. A bird-cage stand having an upright portion consisting of two pipe sections arranged in alignment one above the other with their adjacent ends threaded and spaced apart, an ornamental joiner between the opposed ends of said pipe sections and having threaded recesses to receive the threaded ends of the pipe sections for connecting the same together, a supporting base secured to the lower end of the lower pipe section, a shell over said base and having an inturned flange at its upper end, a cage supporting arm at the upper end of the upper pipe section, a fitting connecting the adjacent ends of the arm and the upper pipe section together, tubes about the upper and lower pipe sections and extending along the same from the joiner to the base and fitting, respectively, with the lower end of the lower tube seating on the flange of the shell, said fitting and joiner having recesses to receive the adjacent ends of the tubes for concealing the joints between them, and a finishing ring fitted about the lower end of the lower tube at said shell.

2. A bird-cage stand, comprising an upright portion, a cage suspending arm at the upper end of said upright portion and a wide base at the lower end of the same, said upright portion being made of relatively short sections of substantially the same length and each consisting of an inner pipe section and an outer surrounding tubing therefor with the tubing extending substantially the full length of the inner pipe section for covering the same, a one-piece connecting fitting between the adjacent end of the arm and the upper end of the upper pipe section with the latter screwed into said fitting, and joiner means for connecting the opposed ends of the pipe sections together in spaced relation, said fitting and joiner means having recesses to receive the adjacent ends of the tubing for concealing the joints between them, the lower end of the lower pipe section being screwed into said base and the tubing about said lower pipe section extending down to said base.

In testimony that I claim the foregoing as my invention, I affix my signature this 20th day of June, 1924.

LEWICKI J. LEON.